United States Patent Office 3,063,962
Patented Nov. 13, 1962

3,063,962
POLYOLEFINS CONTAINING 4,4'- AND 2,4'-DI-ALKYLAMINODIPHENYL ETHERS AS ANTI-OXIDANTS
Henryk A. Cyba, Chicago, Ill., assignor to Universal Oil Products Company, Des Plaines, Ill., a corporation of Delaware
No Drawing. Filed June 6, 1960, Ser. No. 33,958
11 Claims. (Cl. 260—45.9)

This is a continuation-in-part of my copending application Serial No. 682,094, filed September 5, 1957, now abandoned, and relates to the stabilization of polyolefin plastics and more particularly to a novel method of retarding deterioration thereof due to oxidation.

The commercial utilization of polyolefin plastics is a comparatively recent development. Polyethylene plastics, for example, possess high dielectric strength, especially at high frequency, and resistance to water and, therefore, are of particular advantage for use as insulators or dielectrics in condensers and other similar electronic equipment, as well as for use as thermoplastic moldings, coating agents, etc. However, it has been found that the polyethylene is subject to attack by atmospheric oxygen, particularly at elevated temperature, either in use or during manufacture, and this impairs the desirable properties thereof including, for example, reduction in the desirable electric properties, gelation upon oxidation, etc. The present invention provides a novel method of retarding this deterioration.

Polypropylene plastics also undergo oxidative deterioration which impairs the desirable properties thereof. The novel features of the present invention are employed to retard such deterioration. Polybutylene plastics similarly undergo deterioration when exposed to oxygen and the present invention also is used to retard the deleterious effect of oxygen on the polybutylene. It is understood that the novel inhibitors of the present invention also are used to stabilize polymeric plastics of higher molecular weight olefins which undergo deterioration due to oxygen.

The polyolefin plastics are of high molecular weight usually having a molecular weight of above about 1000 and extending into the hundreds of thousands range. The polyolefins may be of the high density, medium density or low density type.

Oxidative deterioration of the polyolefin plastic is retarded by incorporating therein a small but antioxidizing concentration of an oxygen ether selected from the group consisting of 4,4'- and 2,4'-dialkylaminodiphenyl ethers in which each alkyl group contains from 3 to 20 carbon atoms, and 4,4'- and 2,4'-dicyclohexylaminodiphenyl ethers.

As will be shown by the data appended to the present specifications, the diaminodiphenyl ethers must possess certain critical features in order to obtain the improved results of the present invention. In the dialkyl substituted compounds, each alkyl group must contain from 3 to 20 carbon atoms and preferably from 3 to 12 carbon atoms. As will be shown by the data appended hereto, compounds meeting this requirement possess unexpectedly superior properties as compared to unsubstituted diaminodiphenyl ethers or diaminodiphenyl ethers in which the alkyl group comprises a methyl group (containing only one carbon atom in the alkyl group). Also, the data show that the dicyclohexyl substituted compounds are of high effectiveness for the stabilization of the polyolefins.

As hereinbefore set forth, one embodiment of the invention comprises the use of N,N'-dialkylaminodiphenyl ethers in which the alkyl group contains from 3 to 20 carbon atoms each. In one embodiment these comprise the 4,4'-di-substituted compounds and are illustrated by the following: 4,4'-dipropylaminodiphenyl ether, 4,4'-dibutylaminodiphenyl ether, 4,4'-diamylaminodiphenyl ether, 4,4'-dihexylaminodiphenyl ether, 4,4'-diheptylaminodiphenyl ether, 4,4'-dioctylaminophenyl ether, 4,4'-dinonylaminodiphenyl ether, 4,4'-didecylaminodiphenyl ether, 4,4'-diundecylaminodiphenyl ether, 4,4'-didodecylaminodiphenyl ether, 4,4'-ditridecylaminodiphenyl ether, 4,4'-ditetradecylaminodiphenyl ether, 4,4'-dipentadecylaminodiphenyl ether, 4,4'-dihexadecylaminodiphenyl ether, 4,4'-diheptadecylaminodiphenyl ether, 4,4'-dioctadecylaminodiphenyl ether, 4,4'-dinonadecylaminodiphenyl ether, 4,4'-dieicosylaminodiphenyl ether, etc. In general, it is preferred that the alkyl groups are of secondary configuration as illustrated by compounds such as 4,4'-diisopropylaminodiphenyl ether, 4,4'-di-sec-butylaminodiphenyl ether, 4,4'-di-sec-amylaminodiphenyl ether, 4,4'-di-sec-hexylaminodiphenyl ether, 4,4'-di-sec-heptylaminodiphenyl ether, 4,4'-di-sec-amylaminodiphenyl ether, 4,4'-di-sec-hexnonylaminodiphenyl ether, 4,4'-di-sec-decylaminodiphenyl ether, 4,4'-di-sec-undecylaminodiphenyl ether, 4,4'-di-sec-dodecylaminodiphenyl ether, etc.

In another embodiment these comprise the 2,4'-dialkylaminodiphenyl ethers in which the alkyl group contains from 3 to 20 carbon atoms each and are illustrated by the following: 2,4'-dipropylaminodiphenyl ether, 2,4'-dibutylaminodiphenyl ether, 2,4'-diamylaminodiphenyl ether, 2,4'-dihexylaminodiphenyl ether, 2,4'-diheptylaminodiphenyl ether, 2,4'-dioctylaminodiphenyl ether, 2,4'-dinonylaminodiphenyl ether, 2,4'-didecylaminodiphenyl ether, 2,4'-diundecylaminodiphenyl ether, 2,4'-didodecylaminodiphenyl ether, 2,4'-ditridecylaminodiphenyl ether, 2,4'-ditetradecylaminodiphenyl ether, 2,4'-dipentadecylaminodiphenyl ether, 2,4'-dihexadecylaminodiphenyl ether, 2,4'-diheptadecylaminodiphenyl ether, 2,4'-dioctadecylaminodiphenyl ether, 2,4'-dinonadecylaminodiphenyl ether, 2,4'-dieicosylaminodiphenyl ether, etc. Generally, it is preferred that the alkyl groups are of secondary configuration as illustrated by compounds such as 2,4'-diisopropylaminodiphenyl ether, 2,4'-di-sec-butylaminodiphenyl ether, 2,4'-di-sec-amylaminodiphenyl ether, 2,4'-di-sec-hexylaminodiphenyl ether, 2,4'-di-sec-heptylaminodiphenyl ether, 2,4'-di-sec-octylaminodiphenyl ether, 2,4'-di-sec-nonylaminodiphenyl ether, 2,4'-di-sec-decylaminodiphenyl ether, 2,4'-di-sec-undecylaminodiphenyl ether, etc.

In general, it is preferred that the dialkylaminodiphenyl ether comprises a symmetrical compound (that is, the alkyl groups are of the same configurations and chain length). However, in some cases, the alkyl groups may be different in either the number of carbon atoms or in the configuration thereof, or both, but are selected from the alkyl groups hereinbefore set forth. In another embodiment, the hydrocarbon radicals attached to the nitrogen atoms may comprise alkenyl groups. The alkenyl groups correspond to the alkyl groups hereinbefore set forth.

In still another embodiment, the diamino- or dialiphatic-aminodiphenyl ether may contain one or more hydrocarbon, hydrocarbon-substituted, or non-hydrocarbon groups attached to one or both of the phenyl rings. The hydrocarbon substituents preferably are selected from alkyl groups including methyl, ethyl, propyl, butyl, amyl, hexyl, heptyl, octyl, nonyl, decyl, undecyl, dodecyl, etc. The substituted hydrocarbon groups may contain oxygen, nitrogen, sulfur and/or halogen and particularly chlorine. The non-hydrocarbon groups are selected from oxygen, nitrogen, sulfur and/or halogen and particularly chlorine. The substituents preferably are in the positions para and/or ortho to the oxygen atom connecting the phenyl rings. Illustrative examples containing chlorine as a substituent include 2-chloro-4,4'-diisopropylaminodiphenyl ether, 2, 2'-dichloro-4,4'-dibutylaminodiphenyl ether, 4-chloro-2, 4'-dihexylaminodiphenyl ether, 2',4-dichloro-2,4'-didecylaminodiphenyl ether, etc.

In still another embodiment the antioxidant comprises 4,4'-dicyclohexylaminodiphenyl ether or 2,4'-dicyclohexylaminodiphenyl ether. As stated above, the phenyl rings may contain hydrocarbon or non-hydrocarbon substitutions. Also, the cyclohexyl groups may contain similar substitutions, these substitutions being selected from those specifically set forth hereinabove.

From the above description, it will be noted that a number of different inhibitors may be used in accordance with the present invention. It is understood that the different inhibitors are not necessarily equivalent in the same or different polyolefin plastic. The selection of the specific inhibitor to be employed will depend upon the specific polyolefin plastic being stabilized. Certain of the inhibitors will be more effective in some polyolefin plastics, while others will be more effective in other polyolefin plastics.

In addition to the fact that the inhibitors of the present invention are particularly effective for the purpose, they offer the additional advantage of being substantially non-discoloring. Therefore, they may be used in white or light-colored polyolefin plastics. Furthermore, no harmful effects have been noted in the normal handling of these inhibitors and, therefore, they are readily usable for the intended purpose.

The inhibitor generally will be utilized in a cencentration of from about 0.0001% to about 1% by weight of the plastic, although in some cases higher or lower concentration may be employed. The exact concentration to be used will depend upon the particular polyolefin being stabilized, and, in most cases, concentrations of from about 0.001% to about 0.5% by weight usually will be employed.

The inhibitor of the present invention is incorporated in the polyolefin plastic in any suitable manner and at any suitable stage of preparation. In a preferred method, the inhibitor is incorporated in the polyethylene during manufacture thereof. However, in cases where the polyethylene has already been manufactured, the inhibitor may be incorportaed therein by melting the plastic and adding the inhibitor to the hot melt with stirring, either in Banbury mixer or extruder, or in any other suitable way. In some cases, the polyolefin plastic may be soaked in a bath of the inhibitor but this last method is not generally satisfactory and only should be used as a last resort.

The inhibitor may be utilized as such or prepared as a solution in a suitable solvent including alcohols, and particularly isopropyl alcohol, isobutyl alcohol, etc., hydrocarbons and particularly benzene, toluene, xylenes, cumene, etc. However, the solvent must not be detrimental to the polyolefin plastic and, therefore, a preferred solvent comprises the same solvent used during the manufacture or working of the polyolefin.

The following examples are given to illustrate further the novelty and utility of the present invention but not with the intention of unduly limiting the same.

EXAMPLE I

The polyethylene used in this example is of the Zeigler Type, high density, and marketed under the trade name of "HI-FAX" by Hercules Powder Company. The effect of the inhibitor was determined by spreading the inhibitor evenly over the surface of a five gram sheet of uninhibited polyethylene, covering the first sheet with another five gram uninhibited sheet, pressing the sheets together at a temperature of 140° C. and a pressure of 10,000 p.s.i. These sheets then are cut into strips of about ⅛" x ⅛" and one gram weighing of the strips are pressed again at a temperature of 140°–150° C. and a pressure of 15,000 p.s.i. The average thickness of the sheets thus prepared is about 5 mils. One gram sheets then are placed in a bomb and exposed to 100 pounds of oxygen at 100° C. The sheets are examined periodically by infrared, and the rate of increase of the carbonyl band at 1715 cm.$^{-1}$ is determined. An intensity value of 40 is taken as the induction period because decomposition is appreciably increased beyond this value.

When evaluated in the above manner, a sample of the polyethylene without inhibitor reached a carbonyl intensity value of 674 in 72 hours. This sample had a very bad odor and was brittle.

The inhibitor used in this example is 2,4'-diisopropylaminodiphenyl ether. It was incorporated in another sample of the polyethylene in a concentration of 0.07% by weight. When evaluated in the above manner, the sample of polyethylene containing the inhibitor reached an intensity value of only 30 after 1944 hours of exposure. The polyethylene had no odor and was not brittle.

From the above data, it will be noted that the inhibitor of the present invention served to effectively retard deterioration of the polyethylene.

EXAMPLE II

The inhibitor used in this example is 4,4'-diisopropylaminodiphenyl ether. When evaluated in the same manner as described in Example I, a sample of the polyethylene containing this inhibitor had a carbonyl intensity value of only 30 after 1512 hours. It had no odor and was not brittle. Here again, it is noted that the inhibitor served to considerably improve the stability of the polyethylene.

EXAMPLE III

The inhibitor of Example I also was evaluated in a medium density polyethylene. This polyethylene is marketed under the trade name of "Hi-D" by the Spencer Chemical Company. This polyethylene is somewhat more stable than the "HI-FAX" polyethylene of Example I and reaches a carbonyl frequency intensity value of about 100 in a very short time without any visible physical deterioration. However, after about 168 hours of exposure in the manner described in Example I, the polyethylene developed a very bad odor with a concurrent complete loss of tear resistance, and after 288 hours it was extremely brittle. In addition to the highly objectionable odor, the carbonyl frequency intensity reached the maximum value of 1000.

Because the medium density polyethylene has a lower melting point, the pressing described in Example I was effected at 120°–130° C. instead of 140°–150° C. Otherwise, the evaluations were made in the same manner as described in Example I.

0.07% by weight of 2,4'-diisopropylaminodiphenyl ether was incorporated in another sample of the medium density polyethylene described above, and this sample developed an intensity value of only 89 after 4800 hours of exposure, again demonstrating the effectiveness of the inhibitor to improve the stability of the polyethylene.

EXAMPLE IV

The polyethylene used in this example is of high density and marketed under the trade name of "Fortiflex" by Celanese Corporation of America. In the samples containing additive, the additive was used in a concentration of 0.075% by weight of the polyethylene and was incorporated therein by milling. The different samples of polyethylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically In this method samples of the polyethylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual monometers containing mercury and the differential pressure is periodically determined. The induction period is taken as the number of hours required to reach a pressure differential of 20 cm. Hg.

The following table reports the results of a number of additives evaluated in the above manner. The table shows the results obtained with a blank or control sample (not containing an additive) and the different samples each containing a different additive in a concentration of 0.075% by weight. The results reported are the average of two and, in some cases four, runs with each additive.

Table I

| Run No. | Additive | Induction Period, Hours to ΔP of 20 cm. Hg |
|---|---|---|
| 1 | None | 7 |
| 2 | 4,4'-diaminodiphenyl ether | 44 |
| 3 | 4,4'-tetramethylaminodiphenyl ether | 42 |
| 4 | 4,4'-diisopropylaminodiphenyl ether | 166 |
| 5 | 4,4'-di-sec-butylaminodiphenyl ether | 117 |
| 6 | 4,4'-di-sec-octylaminodiphenyl ether | 109 |
| 7 | 4,4'-dicyclohexylaminodiphenyl ether | 361 |

From the data in the above table, it will be seen that both the unsubstituted diaminodiphenyl ether (run 2) and the tetramethyl substituted compound (run 3) were of only mild effectiveness. In contrast, the diisopropyl compound (run 4), di-sec-butyl compound (run 5), di-sec-octyl compound (run 6) and the dicyclohexyl compound (run 7) all were very effective in stabilizing the polyethylene, with the dicyclohexyl compound being exceptionally outstanding in this polyethylene.

EXAMPLE V

A similar but smaller study was made in a like manner to that described in Example IV but using the corresponding 2,4'-di-substituted compounds. This study was made in the same manner as described in Example IV, and the results thereof are reported in the following table:

Table II

| Run No. | Additive | Induction Period, Hours to ΔP of 20 cm. Hg |
|---|---|---|
| 1 | None | 7 |
| 8 | 2,4'-diaminodiphenyl ether | 46 |
| 9 | 2,4'-diisopropylaminodiphenyl ether | 153 |
| 10 | 2,4'-di-sec-butylaminodiphenyl ether | 114 |

Here again it will be noted that the unsubstituted compound (run 8) was only of mild potency, whereas the diisopropyl compound (run 9) and the di-sec-butyl compound (run 10) were effective in stabilizing the polyethylene.

EXAMPLE VI

The polyolefin plastic used in this example is polypropylene marketed under the trade name of "Moplen" by Montecatini. However, because polypropylene is normally less stable than polyethylene, the additive was used in a large concentration of 0.15% by weight of the polypropylene. The polypropylene samples were prepared and evaluated in the same manner as described in Example IV. The results of these runs are reported in the following table:

Table III

| Run No. | Additive | Induction Period, Hours to ΔP of 20 cm. Hg |
|---|---|---|
| 11 | None | <1 |
| 12 | 4,4'-di-sec-butylaminodiphenyl ether | 189 |
| 13 | 2,4'-di-sec-butylaminodiphenyl ether | 130 |
| 14 | 4,4'-dicyclohexylaminodiphenyl ether | >236 |

Here again it will be noted that the 4,4'-di-sec-butyl compound (run 12) and the 2,4'-di-sec-butyl compound (run 13) were effective in stabilizing the polypropylene, with the dicyclohexyl substituted compound (run 14) being especially outstanding in this particular polypropylene.

EXAMPLE VII

The inhibitor used in this example is 4,4'-di-sec-decylaminodiphenyl ether. This inhibitor is incorporated in a concentration of 0.25% by weight by milling the inhibitor into polybutylene. The polybutylene then is further processed in a conventional manner. The incorporation of the inhibitor serves to prolong the stability of the polybutylene during subsequent exposure to oxygen.

I claim as my invention:

1. Polyolefin plastic selected from the group consisting of polyethylene, polypropylene and polybutylene normally subject to oxidative deterioration containing an antioxidizing concentration of an oxygen ether selected from the group consisting of 4,4'- and 2,4'-dialkylaminodiphenyl ethers in which each alkyl group contains from 3 to 20 carbon atoms and 4,4'- and 2,4'-dicyclohexylaminodiphenyl ethers.

2. Polyethylene normally subject to oxidative deterioration containing an antioxidizing concentration of an oxygen ether selected from the group consisting of 4,4'- and 2,4'-dialkylaminodiphenyl ethers in which each alkyl group contains from 3 to 20 carbon atoms and 4,4'- and 2,4'-dicyclohexylaminodiphenyl ethers.

3. The composition defined in claim 2 wherein said oxygen ether is 4,4'-dicyclohexylaminodiphenyl ether.

4. The composition defined in claim 2 wherein said oxygen ether is 2,4'-dicyclohexylaminodiphenyl ether.

5. The composition defined in claim 2 wherein said oxygen ether is 4,4'-diisopropylaminodiphenyl ether.

6. The composition defined in claim 2 wherein said oxygen ether is 2,4'-diisopropylaminodiphenyl ether.

7. The composition defined in claim 2 wherein said oxygen ether is 4,4'-di-sec-butylaminodiphenyl ether.

8. The composition defined in claim 2 wherein said oxygen ether is 2,4'-di-sec-butylaminodiphenyl ether.

9. Polypropylene normally subject to oxidative deterioration containing an antioxidizing concentration of an oxygen ether selected from the group consisting of 4,4'- and 2,4'-dialkylaminodiphenyl ethers in which each alkyl group contains from 3 to 20 carbon atoms and 4,4'- and 2,4'-dicyclohexylaminodiphenyl ethers.

10. The composition defined in claim 9 wherein said oxygen ether is 2,4'-dicyclohexylaminodiphenyl ether.

11. Polybutylene normally subject to oxidative deterioration containing an antioxidizing concentration of an oxygen ether selected from the group consisting of 4,4'- and 2,4'-dialkylaminodiphenyl ethers in which each alkyl group contains from 3 to 20 carbon atoms and 4,4'- and 2,4'-dicyclohexylaminodiphenyl ethers.

References Cited in the file of this patent

UNITED STATES PATENTS 2,654,722　　Young et al. _____ Oct. 6, 1953

FOREIGN PATENTS 430,335　　Great Britain _____ June 11, 1935